(12) United States Patent
Sadri

(10) Patent No.: US 10,668,407 B2
(45) Date of Patent: Jun. 2, 2020

(54) SUPERCRITICAL FLUID CHROMATOGRAPHY LASER WAVE MIXING DETECTION METHODS AND APPARATUS

(76) Inventor: Behrokh Bagherifar Sadri, San Diego, CA (US)

( * ) Notice: Subject to any disclaimer, the term of this patent is extended or adjusted under 35 U.S.C. 154(b) by 342 days.

(21) Appl. No.: 13/586,875

(22) Filed: Aug. 16, 2012

(65) Prior Publication Data

US 2014/0047908 A1    Feb. 20, 2014

(51) Int. Cl.
  *G01N 1/00*      (2006.01)
  *B01D 15/40*     (2006.01)
  *G01N 30/74*     (2006.01)

(52) U.S. Cl.
  CPC ............. *B01D 15/40* (2013.01); *G01N 30/74* (2013.01)

(58) Field of Classification Search
  CPC .................. G01N 30/74; G01N 2030/022
  USPC .......... 422/70, 82.05–82.11; 210/198.2, 656; 73/61.52–61.61
  See application file for complete search history.

(56) References Cited

U.S. PATENT DOCUMENTS

2006/0263777 A1*  11/2006  Tong ............................ 435/6
2011/0261363 A1*  10/2011  Picque et al. .............. 356/451
2012/0006750 A1*  1/2012   Miyazawa et al. ......... 210/656

OTHER PUBLICATIONS

Sadri, "Protein Analysis at the Single Cell Level by Nonlinear Laser Wave-Mixing Spectroscopy for High Throughput Capillary Electrophoresis" 2008.*

* cited by examiner

*Primary Examiner* — Jyoti Nagpaul
(74) *Attorney, Agent, or Firm* — John A. Barrett

(57) ABSTRACT

This invention relates to methods and apparatus of a combination of laser wave mixing technology with diagnostic flow technologies with embodiments describing supercritical fluid chromatography. The combination of these technologies along with minute detection levels have not yet been seen in the field.

9 Claims, 1 Drawing Sheet

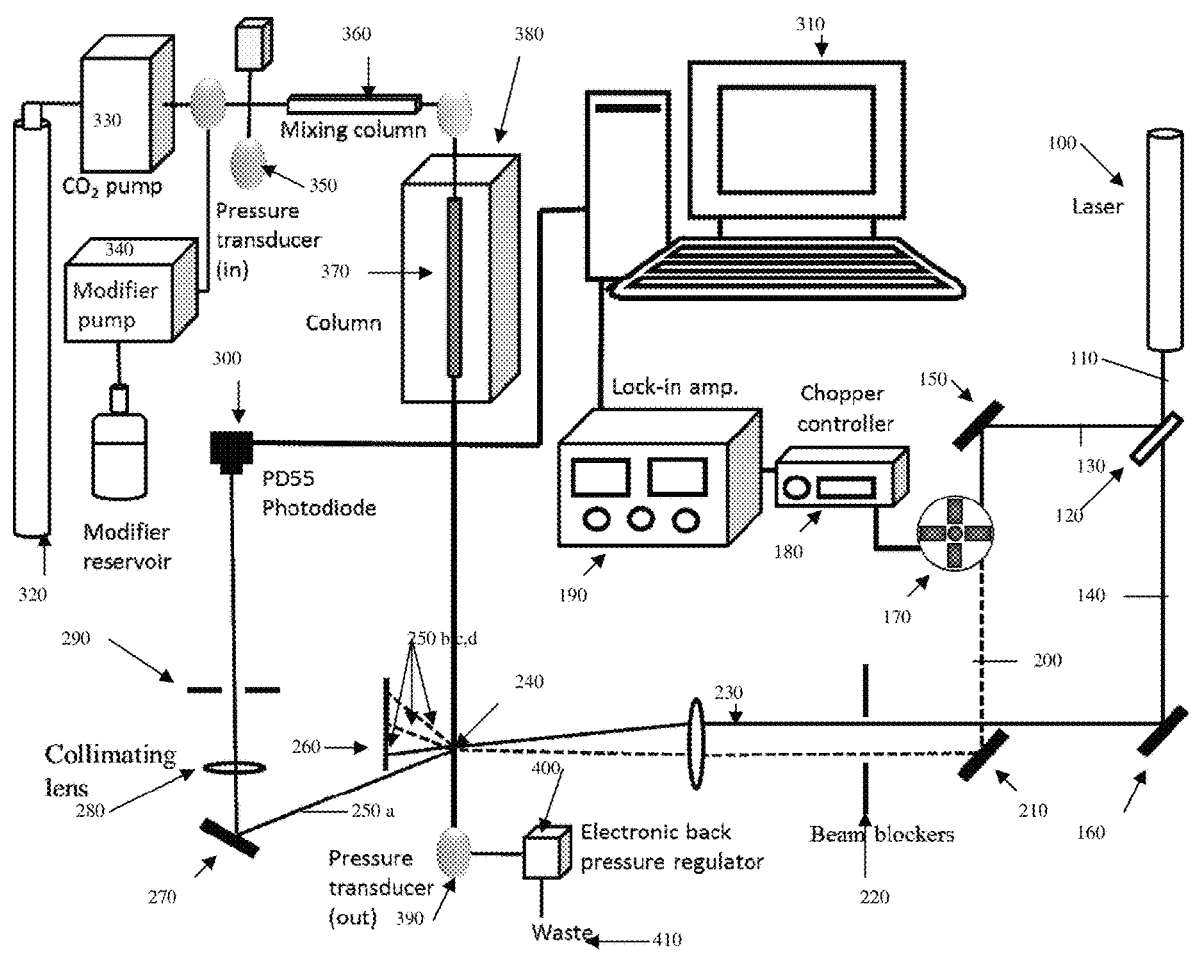

SUPERCRITICAL FLUID CHROMATOGRAPHY LASER WAVE MIXING DETECTION METHODS AND APPARATUS

This application claims priority under 35 U.S.C. § 119(e) to U.S. provisional patent application 61/523,529, filed Aug. 15, 2011.

This invention relates to methods and apparatus of a combination of laser wave mixing technology with diagnostic flow technologies with embodiments including supercritical fluid chromatography described herein. The combination of these technologies along with minute detection levels not yet been seen in the field.

BACKGROUND

Laser wave mixing has been described in many patents, journals and articles. Having greatest relation to embodiments of the invention described herein are Tong has described degenerate four wave-mixing and apparatus therein in U.S. Pat. Nos. 5,600,444 and 6,141,094 and Patent Application 2006263777. These describe apparati and methods that in their capacities are capable of analyzing small quantities of analytes down to a detection level of attomoles. They utilize different complements of analysis systems including HPLC and HCPE and a gas phase atomizer type spectroscopy. Furthermore, the dissertation "Protein Analysis at the Single Cell Level by Nonlinear Laser Wave-Mixing Spectroscopy for High Throughput Capillary Electrophoresis Applications" from Sadri's PhD dissertation N.C. State from 2008 relates similar apparati discussed in the Tong patents that reach the levels of detection of yoctomoles ($10^{-24}$). The named articles, dissertations and patents are incorporated by reference in their entirety. These references give a background into the theories, adjustments and variations upon the technology that are explanatory. Similarly, supercritical fluid chromatography (SFC) has been explained and describe in many patents and journal articles. A review article gives a good example of the technology as used with chiral compounds "Enantioseparations in super- and subcritical fluid chromatography" Gerald Terfloth, *J. Chromatogr. A* 906 (2001) 301-307. This reference gives a modern view of how SFC is used with the different column technologies and instrumentation techniques. Some advantages of SFC are: higher efficiency, wider range of selectivity, longer column lifetime, lower solvent and waste disposal cost, using less toxic solvents and faster run time and overall more environmentally cleaner than other techniques.

As used in this specification and in the appended claims, the singular forms "a," an" and "the" include plural references unless the content clearly dictates otherwise.

In describing the invention and embodiments, the following terms will be employed and are intended to be defined as indicated below. If any terms are not fully defined, then the normal usage as used in the art will fill any gaps in the understanding of the terminology.

Laser: is a device that creates a beam of light where all of the photons are in a coherent state—usually with the same frequency and phase. Among the other effects, this means that the light from a laser is often tightly focused and does not diverge much, resulting in the traditional laser beam. In free space, the beams inside and outside the cavity are usually Gaussian distributed and are highly collimated with very small divergence. The distance over which the laser beam remains collimated depends on the square of the beam diameter while divergence angle varies inversely with the beam diameter.

Collimating: is the process of making light rays parallel from a mixture of diverging light rays or beams, and therefore will spread slowly as it propagates. The word is related to "collinear" and implies light that does not disperse with distance (ideally), or that will disperse minimally (in reality). A perfectly collimated beam with no divergence cannot be created due to diffraction, but light can be approximately collimated by a number of processes, for instance by means of a collimator. A focusing lens with high focal point (1000 mm) is an example collimating lens.

Diagnostic flow technology: Is a solid state technology through a series of pumps or pump like mechanisms (such as electroosmotic flow, electrophoretic flow, capillary action, siphoning, pressure, imploding gas bubbles and the like) and apparati move analytes from a sample collection area to an analysis area which comprise of multiple detectors types such as photodiode arrays (PDA), ultraviolet-visible (UV-VIS) spectrometers, charge coupled device (CCD) (such as Fourier Transform Infrared (FT-IR)}, Nuclear Magnetic Resonance (NMR) detectors, Refractive Index spectrometers (RI), fluorescence detectors, radiation photomultipliers, and the like. Flow can be achieved through liquids, fluids, gas or other means pumped or other means driven through a series of channels and mediums (such as tubing or silica gels) to move analytes from one point to another. Examples would comprise but not limited to Liquid Chromatography (LC) (which would further comprises variations such as micellar, ion exchange and the like), Reverse Phase High Performance Liquid Chromatography (RP-HPLC), Gas Chromatography (GC), High Performance Capillary Electrophoresis (HPCE), Capillary Zone Electrophoresis (CZE), Supercritical Fluid Chromatography (SFC), Subcritical Fluid Chromatography (SubFC), Inductively Coupled Plasma (ICP), and the like. Each technology is unique unto its own with positives and negatives propagating from each in achieving the needs of the user. For example, capillary electrophoresis has environmental positives in utilizing very little hazardous materials but has negative issues in what substances can be an analyzed and in what solvents are compatible.

Focal spot: an area or point onto which collimated light parallel to the axis of a lens is focused. This spot of light can be expanded and contracted in different shapes and geometries by some means such as a cylindrical lens.

Absorptive interaction: interaction of analytes in a flow cell chamber or multi channel chamber that creates a signal through the beam wave mixing when the two input beams form light induced gratings and an input beam is diffracted off this grating when analytes absorb the excitation light beam. The excited molecules in the form of interference patterns release their heat energy to surrounding solvent or matrix molecules, creating dynamic thermal gratings, and as a result, refractive index gratings. The incoming photons from the probe beam diffract off the gratings to generate the output signal beams.

Multichannel chamber: an enclosed space in which is configured to allow an absorptive interaction between multiple analytes and light beams. Multichannel flow cells and capillary arrays can be situated in a multichannel chamber.

SUMMARY

The embodiments explained and described here utilize techniques to elucidate very small amounts of analyte with high sensitivity, selectivity, resolution and throughput.

The embodiments comprise of a diagnostic flow technology linked to a non linear optical wave mixing technique of a laser source of light absorptively interacting. Wherein, the interaction of the analyte and beam of light are sensed by detectors at a very small molar amount.

The embodiments of the invention can be described by example. In a summary example, device couples a quadruple Nd:YAG laser beam in a unique ultraviolet (UV) wavelength of 266 nm utilizing a non linear wave mixing sensing technique with an SFC diagnostic flow technology utilizing a nanoliter flow cell. This example device can be used to elucidate chiral compounds and native proteins, down to the levels of yoctomoles ($10^{-24}$) and sub-yoctomoles.

Embodiments reaching this yoctomole sensitivity allows for very small injected sample quantities. These levels would have many broad spectrum uses in pharmaceutical, environmental, forensic, cosmetics, nutritional supplement and anti-terrorism industries. Analyzing such multiple small quantities can increase efficiencies in time, cost, and material waste in analysis procedures. The coupling of the wave mixing technique and the SFC creates a green technology reducing waste streams 80% compared to conventional diagnostic flow separation techniques. Analysis time can be cut 2× to 5× because of the acutely small amounts to be analyzed allows for sub-microfluidic components that help miniaturize work bench foot print and speed of analysis times. The embodiments' configurations allow for short optical path lengths which can allow for compact miniaturization of the equipment box. Embodiments of the invention can achieve 100% optical collection efficiencies for signals measured against a dark background. The embodiments' unique features include quadratic dependency on sample absorption coefficient and concentration, cubic dependency on laser power, coherent laser-like signal beams. Implementation of the embodiments comprise methods of analyzing substances through use of a diagnostic flow technology injecting a small amount of analytes into a flow cell chamber, creating multiple beams of light through the use of a non linear optical wave mixing technique, eliciting or generating a signal for an analyte, sensing the signal beams, and manipulating and storing the data.

An embodiment of the invention utilizes methods of analysis of the combination of technologies. Included in these methods is creating a laser beam also known as a light beam or light ray by some laser sensing technology. From propagation the laser beam will be guided and manipulated through a series of devices, reflective surfaces such as mirrors, beam traps, beam blockers, beam choppers, beam splitters, focusing lenses, collimating lenses with an interconnecting to electronic devices including, a computer to both control the front end processes of propagating the light source and running the diagnostic flow technology to the back end process of receiving the data and processing it into useable output; a photodiode detector to receive the signal light input which could include an amplification of the signal with a photo multiplier tube, a lock in amplifier to filter out extraneous frequencies, a beam chopper controller which controls or segregates the frequency in which the output beam is settled.

As the beam is split into a probe beam also know as high ratio beam and a reference beam also known as low ratio beam, the beams are then focused onto a sample flow cell stage. This stage is the interaction and interconnection of the diagnostic flow technology with the laser wave mixing. In one embodiment the diagnostic flow technology is an analytical SFC device. This device has a source of high pressure gas that is further pressurized into a sub or super critical fluid. The device will accumulate the pressurized gas which include but not limited to $CO_2$, $N_2$, and pump it with some modifier such as methanol but other modifiers are contemplated such as isopropanol, and butanol, with acids and bases additives contemplated to be added to the modifier. This list is not exhaustive and many other solvents and additives are contemplated. The person skilled in the art would have need for different modifiers based on the column technology or analyte characteristics. The super critical fluid and modifier are pumped in an isocratic method or a gradient method of variable percentages of fluid and modifier. The pressurized fluid/modifier is mixed in chamber or column and receives a minute scale of sample analyte and moves the analyte onto column for separation. The separation can be achieved through use of isocratic and gradient percentages of the supercritical fluid and modifier either methods alone or in combination. After separation is achieved, the analyte will move through a series of microbore tubing to the sample flow cell. One embodiment utilizes a 6 mm pathway length nanoliter volume flow cell. Other sizes and volumes are contemplated in which the smaller the volume the less hazardous materials are utilized without appreciable loss of sensitivity, resolution, or selectivity. The sample analyte moves through the flow cell to an optional gas recovery device or to waste. Other embodiments may have a mass spectrum device connected to the fluidic flow post or pre sample flow cell. The sample interacts with convergent or divergent light beams moving through an aperture in the sample flow cell window. Other embodiments may have capillary arrays and flow cells. The multi channel embodiments may have variations on the guided pathway such as cylindrical lenses to expand the beam onto the array. Similarly a Photodiode array or some type of detector to capture multiple signals at once should be configured in the system as well. After penetrating, the post flow cell the light beams are manipulated through a beam trap and signal beam is collimated into a coherent light beam. This beam is directed to a detector in some embodiments could be photodiode detector. The beams are detected and the signal is translated through computer applications to useable data.

BRIEF DESCRIPTION OF THE DRAWING

The objects, advantages, and features of the invention will become more apparent from the following detailed description, when read in conjunction with the accompanying drawing, in which:

FIG. 1. is a schematic view of an example embodiments of the invention showing a guided light path with the light beams represented by lines interconnected to an SFC system.

DETAILED DESCRIPTION

Referring to the embodiments in FIG. 1, a schematic view showing an embodiment of the invention utilizing a Super Critical Fluid Chromatography (SFC) diagnostic flow technology. The laser light source 100 emits and presents a coherent beam 110 to a beam splitter 120. Many sources of laser light are contemplated but lower wattage lasers give advantages to cheaper price and less robust materials in the beam manipulative devices. Preferred laser is the quadrupled Nd:YAG laser emitting 266 nm radiation at a high pulse frequency. Embodiments contemplate different types of lasers. Depending on the techniques used in the cavity, such as Q-switching, mode locking or gain switching, the laser output may be continuous wave (CW) or pulsed. When the waveform is pulsed, higher peak powers are achieved. Dye lasers and vibronic solid-state lasers can generate a wide range of wavelengths that are appropriate for generating extremely short pulses of light ($10^{-15}$ s). Other types of lasers contemplated are gas, chemical, excimer, solid state, photonic crystal, semiconductor, free electron, bio, and exotic. A laser type for implementation of the embodiments are solid state Neodynium:yttrium aluminum garnet (Nd:YAG) lasers tuned to 266 nm wavelength suitable for native protein absorption measurements. This UV laser (Model, NU-10210-100, Teem Photonics, France) also offers low power consumption (5 mW) and a good beam quality. Embodiments of the invention can use either higher power (>1 W) or lower power lasers (<1 W). Lower power lasers allow for less damage to optical components, less cost to acquire and to use. To prevent laser damage to optical components and depending on the wavelength ranges and power, there are several optical materials commonly used comprise of borosilicate crown glasses (BK7), UV grade fused Silica, $CaF_2$, $MgF_2$, crystal Quartz, Pyrex and Zerodur.

The preferable split ratio of the laser beam is 70:30 but other ratios are contemplated with the lower ratio traveling as beam 130. Beam 130 travels to reflective surface or a mirror 150 which brings the beam to the beam chopper 170 controlled by chopper controller 180 and lock-in amplifier 190 which among other things amplifies and modulates the cycles of the light wave preferably to 200 Hz. Other cycles are contemplated as the utility demands. The modulated beam 200 travels to mirror 210 which redirects the beam through beam blocker 220 allowing visually adjustment of the beams towards the focusing convex lens 230. The preferably higher ratio beam 140 travels to mirror 160 and redirects the beam through beam blocker 220 towards focusing convex lens 230. Beams 200 and 140 are mixed and focused in the flow cell 240. Person of ordinary skill can manipulate the spatial configuration such as distance, size and shape of the lenses allows for the beam focusing and expansion which allows for variable size focal spots and in variable areas on the X,Y,Z coordinate plane of the sample cell window on the flow cell chamber 240. Dependent on the materials used embodiments of the invention may reach to yoctomoles level in analysis of analytes with for merely an example of analyte of native protein with an amino acid tyrosine in the sequence utilizing a laser at wavelength 266 nm.

Other analytes contemplated but not limited to are cells, biomolecules and small molecules such as labeled or unlabelled tagged and un-tagged proteins, native proteins, peptides, peptidomimetics, polysaccharides, nucleic acids, amino acids, adjuvants, celluloses, biopolymeric molecules, lipids, cell parts, organic compounds, inorganic compounds, antibodies, DNA, RNA, variations on DNA and RNA, nucleotides, drug, drug candidates, biopharmaceuticals, environmental chemicals, astral chemicals, geophysical chemicals, forensic chemicals, chiral, enantiomers, stereoisomers, optical isomers, solids, liquids and gases. At such low levels of concentration the real time analysis or efficient analysis of metabolic chemicals are contemplated.

Contemplated wavelengths of the laser beam are from the below ultraviolet (UV) range through the visible light spectrum beyond the infrared depending on the lasers capabilities and spectral characteristics of the analyte. For example, the UV spectrum for amino acid residues of tyrosine, tryptophan, and phenylalanine reaches a peak of extinction coefficients between 245 nm and 280 nm. Native proteins including L and D versions of the amino acids or residues would be contemplated examples of use of the UV spectrum detection. A laser beam tuned to a unique 266 nm wavelength would be efficient in absorbing an analyte containing these residues. Similarly in another example a protein analyzed with a laser beam tuned to 210 nm would efficiently elucidate the peptide bond whose extinction coefficient reaches its maximum at 190 nm. Other embodiments contemplate UV wavelengths between 10 nm and 400 nm, visible spectrum between 380 and 800 nm and infrared from 740 nm to 300000 nm. Embodiments contemplates individual UV wavelengths or spectrums of wavelengths ranging between 190 nm and 300 nm with other individual UV wavelengths and ranges contemplated such as 210 nm to 280 nm and an individual UV wavelength at 210 nm, 254 nm, 266 nm, and 280 nm.

The coherent remnant beams 250$a,b,c,d$ after absorptive interaction in the flow cell when penetrating and passing through the sample flow cell chamber on the stage 240 are separated into beams 250$b$, $c$, $d$ into beam trap 260 and signal beam 250$a$ to mirror 270. Beam 250$a$ is passed through a collimating lens 280 which among other things is used to prevent too much signal divergence and to minimize optical interference from such things as the flowing solution temperature changes, flow cell transparent surface material, and non-distinct impurities found in both. The beam 250$a$ is sent through a beam blocker for precise alignment to a detector 300 shown here as a photodiode detector to be detected, stored and analyzed among other data manipulations in the computer 310. It is contemplated analog to digital converters would be used as needed by the application. Embodiments of the invention show the analyte sample is presented into a flow cell through use of a SFC diagnostic flow technology.

The SFC system includes a high pressure gas supply 320 shown in this embodiment as $CO_2$ other gases such as He, $N_2$, $NO_x$, trichloromethane, or sulfur hexafluoride, and other experimental super or sub critical gases are contemplated. The gas is pumped by means of pump 330, added to this is a modifier also known as a co-solvent which can be chosen from many alcohols and other solvents based on needs of the experiment. Methanol, ethanol, isopropanol, acetonitrile and dichloromethane are some examples of modifiers. Acids and bases can also be added to the modifier. The combined modifier and the gas pumped to pressure that brings it to or near super critical fluid is mixed in a mixing chamber 350 or column usually a static chamber an inline sampler can be added into the system at a the juncture between the mixing column and the column.

The column 370 can be of many different stationary phases with a preferred column phase of chiral packing usually proprietary substances. The column can be optionally placed in column heater 380. Heating can change the conformation of the analyte in the flow cell and affect the light beam diffraction vectors through the fluid. The sample is then passed through microbore tubing to sample flow cell stage containing the sample flow cell. The flow cell conformation and configuration can affect the passage of the light beam through the transparent material of the cell window. Flow cells can range in different sizes with a 6 mm and nanoliter volume cell being an example of a preferred size for low flow and high resolution.

The sample flow cell should be tuned with some known material to get an accurate analysis of yoctomole concentrations. The tuning should be to get the beam in a spot on the flow cell that is optimized through the power of the laser beam, the angle of attack of the high ratio beam and the low ratio beam onto the flow cell aperture, and focusing lenses used prior to light entering the flow cell. As part of the tune, the post flow cell light beams should be organized into collimating lens at optimal distances that give the best detection response. Pressure transducers 350 and 390 are placed before and after sample stage to monitor system pressure. With feedback from the transducers the Back Pressure regulator 400 a keeps system at set pressure. An optional gas recovery system can be put on the end of the SFC before the waste 410 for more environmentally friendly efficient closed loop system.

It is contemplated in other embodiments of the invention that the multiple analytes could be staged on a multi-configured flow cell. Embodiments contemplate further a Mass Spectrometer coupled to the SFC wave mixing apparatus to allow such things as APCI and MSI and MS/MS detection. The Mass Spectrometer would be placed optimally to divert a small flow placed just after the sample flow cell. Diversion before the flow cell is also contemplated. Other detection methods highly useable with SFC such as flame ionization (FID) and evaporative light scattering device (ELSD) are contemplated. It is contemplated that a laser tunable and adjustable to higher power ranges coupled with optical apparati that are robust enough to handle the more extreme laser powers could double as a simultaneous UV and MS excitation for analyte molecules. Similarly, other diagnostic flow technologies allowing multi array of flow cells or chambers allowing spectral absorptive interaction on different areas of the flow cells are contemplated. Embodiments also contemplate multiple laser light sources.

While the invention has been described in terms of various preferred embodiments and specific examples, the invention should be understood as not being limited by the foregoing detailed description, but as being defined by the appended claims and their equivalents.

What I claim is:

1. An apparatus comprising a single laser four wave mixing sensing device exclusively utilizing the properties of the four wave mixing effect connected to an analytical scale super critical fluid chromatography (SFC) diagnostic flow technology wherein the laser wave mixing sensing device comprises of functionally integrated and interconnected devices:
   a. a laser light source positioned and connected with the apparatus to send out a laser light beam into a guided pathway,
   b. the guided pathway comprising of interconnected devices, said interconnected devices having connections to a computer for electronic devices and also connections to the guided pathway for the light beam through positioning of the light beam or for other devices through positioning in the guided pathway for the light beam, with said other devices positioned to manipulate said laser beam towards a sample stage and subsequently to a signal detecting device,
   c. further wherein the SFC comprises a source of gas connected to a pump, a modifier solvent connected to a modifier solvent pump with both pumps connected to the apparatus utilizing micro scale tubing allowing an analyte and fluid to flow into a first pressure transducer further connected with micro scale tubing to a mixing column, which is connected with micro scale tubing to a separation column, which is connected with micro scale tubing to a sample flow cell with an aperture aligned with the guided pathway such that the light beam enters the sample flow cell through the aperture, which is connected to a second pressure transducer further connected with micro scale tubing to a back pressure regulator connected to a gas recovery system connected to a liquid waste receptacle.

2. The apparatus of claim 1, wherein the flow cell is a nanoliter less than 6 mm pathway flow cell.

3. The apparatus of claim 1, wherein the laser light source is a low wattage laser.

4. The apparatus of claim 3, the laser light source is a Nd:YAG laser.

5. The apparatus of claim 1, wherein functionally integrated and interconnected electronically guided pathway of devices to manipulate the laser beam comprises:
   a. a computer interconnected to electronic devices coupled to,
   b. a lock in amplifier and coupled to,
   c. a beam chopper controller and coupled to,
   d. a beam chopper,
   e. further comprising a beam splitter splitting said laser input beam into two pump beams at 70:30 ratio and 90 degree angle in a box format and sending lower ratio beam to,
   f. a reflective mirror diverting said lower ratio beam to said beam chopper subsequently the light beam moves towards,
   g. a second reflective mirror receiving the chopped beam which diverts it to,
   h. a focusing lens,
   i. a third reflective mirror receiving the higher ratio second beam from said split beams sending the light beams to the focusing lens,
   j. a first set of two beam blockers are placed before focusing lens to block scattered light, increase signal to noise ratio, and allow remnant beams to pass through,
   k. an inline flow cell with aperture aligned with and receiving high and low ratio focused beams; with flow cell further comprising an absorbing medium and an analyte flowing through flow cell absorbing some of said focused beams whereas concurrent said focused beams creating thermal gratings changing the diffractive index of the medium and analyte, which interactions of said focused beams with the medium and analyte creating output signal beams, which the signal beams exit the flow cell towards,
   l. a beam trap located on the signal beams exit side of the flow cell with a portion of the signal beam moving towards,
   m. a fourth reflective mirror diverting the portion of the signal beam to,
   n. a collimating lens further sending the collimated signal beams towards,
   o. a second set of two beam blockers allowing remnant collimated signal beams to pass through while enhancing signal to noise ratios with said collimated signal beams moving towards,
   p. a photodetector-interconnected to the computer.

6. The apparatus of claim 5, wherein the photodetector is a photodiode detector.

7. The apparatus of claim 1, wherein the laser light source creates a coherent beam in the UV spectrum.

8. The apparatus of claim 7, wherein the UV spectrum for the laser is 266 nm.

9. An apparatus comprising a single laser four wave mixing sensing device exclusively utilizing the properties of the four wave mixing effect functionally integrated and interconnected with:
   a. a computer interconnected to electronic devices including, b. a 226 nm wavelength Nd:YAG laser emitting a light beam and,
c. a lock in amplifier amplifying the light beam and,
d. a beam chopper controller chopping the light beam,
e. further comprising a beam splitter, which splits said laser's amplified light beam into two beams with a ratio of 70:30 with 30 ratio beam sent to,
f. a reflective mirror diverting the 30 ratio beam towards,
g. a beam chopper interconnected with the beam chopper controller with the 30 ratio chopped beam then sent to,
h. a second reflective mirror sending the 30 ratio chopped beam towards,
i. a first set of two beam blockers,
j. further comprising a third reflective mirror receiving said second split 70 ratio beam sending the second beam towards said first set of two beam blockers,
k. further comprising a focusing lens, receiving remnant 70 and 30 ratio beams and sending focused beams towards,
l. a nanoliter inline sample flow cell with an aperture aligned with the incoming focused beams with signal beams exiting the flow cell towards,
m. a beam trap, with remnant signal beams moving towards,
n. a fourth reflecting mirror diverting the remnant signal beams towards,
o. a collimating lens, with the collimated signal beams angled towards,
p. a second set of two beam blockers, with remnant collimated signal beams sent towards,
q. a photodiode detector interconnected with said computer;
r. further comprising a SFC interconnected to apparatus through said nanoliter inline sample flow cell and the computer, said SFC further comprising a source of gas connected to a pump, a modifier solvent connected to a modifier solvent pump with both pumps and inline devices connected to the apparatus utilizing micro scale tubing allowing analyte and fluid to flow into a first pressure transducers, connected to a mixing column, which is connected to a separation column, which is connected to said sample flow cell moving, which is connected to a second transducer, which is further connected to a back pressure regulator connected to a gas recovery system, connected to a liquid waste receptacle,
s. further comprising, a liquid flow mass spectrometer interconnected with the computer and through a diversion in the micro scale tubing after the nanoliter inline sample flow cell.

* * * * *